(12) United States Patent
Nozaki et al.

(10) Patent No.: US 6,396,998 B1
(45) Date of Patent: May 28, 2002

(54) DVD RECORDING/REPRODUCING APPARATUS HAVING A HIGH-SPEED COPYING CAPABILITY

(75) Inventors: Mitsuyuki Nozaki, Tokyo; Shinichi Kikuchi, Kanagawa-ken, both of (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/655,311

(22) Filed: Sep. 5, 2000

(51) Int. Cl.[7] ................................................. H04N 5/92
(52) U.S. Cl. .............................. 386/52; 386/64; 386/94; 386/95; 386/125
(58) Field of Search ................................ 386/1, 45, 47, 386/52, 64, 94, 95, 96, 98, 105, 106, 111, 125, 126; 360/13, 12, 60; 369/83, 84; 380/201, 202, 203; H04N 5/76, 5/92, 5/93, 9/79

(56) References Cited

U.S. PATENT DOCUMENTS 5,694,381 A    12/1997   Sako

FOREIGN PATENT DOCUMENTS

JP    9-55025    2/1997

*Primary Examiner*—Thai Tran
(74) *Attorney, Agent, or Firm*—Pillsbury Winthrop

(57) ABSTRACT

A DVD recording/reproducing apparatus according to the present invention includes a copy range designator for designating a copy range of data to be copied from a source disc to a dubbing disc, a VOBU fetcher for fetching VOBU according to information designated by the copy range designator, a copy protection information fetcher for fetching copy protection information from control packs in the VOBU fetched by the VOBU fetcher, a copy protection information determiner for determining a type of copy protection type, such as copy-fully-permitted, only-once copy-permitted, or copy-prohibited according to the information from the VOBU fetcher, a copy protection information updater for updating the copy protection information when determined copying of data being permitted, and a disc drive for recording data thus processed into the dubbing disc.

4 Claims, 17 Drawing Sheets

CTL PACK STRUCTURE

| PACK HEADER | SYSTEM HEADER | PACKET HEADER STREAM ID=0×bf (PRIVATE STREAM 2) | ID=0×02 | CTL DATA |
|---|---|---|---|---|

←──────────── 2048 BYTES ────────────→

CTL PACK DATA

| RBP | | | CONTENTS | BYTES |
|---|---|---|---|---|
| 0 | 0 | CPI | COPY CONTROL INFORMATION | 1 |
| 1 | 2002 | | RESERVED | 2002 |
| | | | TOTAL | 2003 |

CPI

| RBP | | CONTENTS | BYTES |
|---|---|---|---|
| | DCI_CCI_SS | STATUS OF PCI & CCI<br>00:COPY-PROHIBITED<br>01:ONLY-ONCE COPY PERMITTED<br>0Xff:FULL COPY-PERMITTED | 1 |
| | | TOTAL | 1 |

FIG.6

NV PACK-PCI_GI

| RBP | | CONTENTS | BYTES |
|---|---|---|---|
| 0 to 3 | NYPCK_LBN | NV PACK LBN | 4 |
| 4 to 5 | VOBU_CAT | VOBU CATEGORY | 2 |
| 6 to 7 | RESERVED | RESERVED | 2 |
| 8 to 11 | VOBU_UOP_CTL | VOBU USER OPERATION CONTROL | 4 |
| 12 to 15 | VOBU_S_PTM | VOBU START PTM | 4 |
| 16 to 19 | VOBU_E_PTM | VOBU END PTM | 4 |
| 20 to 23 | VOBU_E_PTM | END PTM OF SEQUENCE END IN VOBU | 4 |
| 24 to 27 | C_ELTM | ELAPSED TIME IN VOBU | 4 |
| 28 to 59 | RESERVED | RESERVED | 32 |
| | | TOTAL | 60 |

VOBU_CAT

APSTB 00:APS OFF, 01:APS TYPE1 ON, 10:APS TYPE2 ON, 11:APS TYPE3 ON

DVD RECORDING/REPRODUCING APPARATUS HAVING A HIGH-SPEED COPYING CAPABILITY

FIELD OF THE INVENTION

The present invention relates to a DVD recording/reproducing apparatus, in more particular, to a DVD recording/reproducing apparatus having a high-speed copying capability.

BACKGROUND OF THE INVENTION

In recent years, moving picture-capable optical disc reproducing apparatuses that carry video data, audio data, and the like, such as LDs (Laser Discs), VIDEO-CDs, etc have been developed, and have prevailed for the purpose of reproducing movie software titles, karaokes, and the like.

Among them, a DVD (Digital Versatile Disc) standard that conforms to the MPEG2 (Moving Picture Coding Experts Group 2) international standards and AC3 (Audio Compression 3) audio compression standards has been proposed.

This standard supports MPEG2 as moving picture compression schemes, AC3-Audio, MPEG-Audio, and the like as audio schemes. The DVD standard is also appended with sub-picture data obtained by subjecting a run-length compression to bit map data for applying captions and control data (navigation packs) for applying special reproducing operations such as a fast-forward or a reverse reproducing operation.

The DVD standard also supports the ISO-9660 (International organization for Standardization 9660) and the Micro UDF (Universal Disk Format) so that computers and the like can read computer data.

Further, at present, the DVD-RAM (Random Access Memory) 2.6 GB (Giga Bytes) standard has been finalized, following the standard for the DVD-ROM (Read-Only Memory), i.e., a record medium that is used for DVD-Videos. Then, DVD-RRAM drives take to pervade as computer peripherals.

Then, at present, finalization of so-called RTR (Real Time Recorder)-DVD standard, i.e., a version of the DVD-Video standard, which is capable of real-time recording/reproduction to/from the DVD-RAMs, is nearing.

The RTR-DVD standard is produced based on the DVD-Video standard, which is now released.

Further, a standard of file systems conforming the RTR-DVDs is now under a preparation.

In the file system standard, a minimum length of data wherein audio/video data must continue is defined for allowing continuous reproductions even if defects or track jumps would have occurred during a real-time video recording operation.

A recording on the RTR-DVDs is carried out in pursuant to the file system standard. Here, copy operations of files recorded on a RTR-DVD can be carried out in two cases, i.e., a case of retaining the reproduction of the RTR-DVD, and another case of making copies of files in a PC (Personal Computer)-like. In the former, since reproduced results from source discs are encoded once again in recording on dubbing discs, qualities of pictures reproduced from the dubbing desks become reduced. Further, since the former is carried out in retaining the reproduction operation, the copying operation takes a period of time the same as that in reproducing operation.

While in the latter, since data are copied as a file the copying operation can be carried out without receiving the influence of the rate of the reproduction. Thus the copying operation is carried out at a very high-speed defined by only the disc drive for the dubbing disc. However, if the video data is guarded by the copy protection information, the source disc video data are copied as they are into the dubbing disc. Thus, the latter has a problem that it cannot reflect copy protection information for copied video data. Conventional DVD recording/reproducing apparatus has a defect that since reproduced results from source discs are encoded once again in recording on dubbing discs, qualities of pictures reproduced from the dubbing desks become reduced. Further, since the former is carried out in retaining the reproduction operation, the copying operation in the conventional DVD recording/reproducing apparatus takes a period of time the same as that in reproducing operation.

Further in making copies of files in a PC-like manner in the conventional DVD recording/reproducing apparatus, since data are copied as a file the copying operation can be carried out without receiving the influence of the rate of the reproduction. Thus the copying operation is carried out at a very high-speed defined by only the disc drive for the copying disc. However, if the video data is guarded by the copy protection information, the source disc video data are copied as they are into the copying disc. Thus, it has a problem that it cannot reflect copy protection information for copied video data.

SUMMARY OF THE INVENTION

The present invention has been made in view of the above problem and an object of the present invention is to provide a DVD recording/reproducing apparatus with a high-speed copying capability in which video data is reproduced in every unit of video object unit VOBU, and checking of copy protection information is carried out for every VOBU, so that, eliminating defects occurring in cases of copy operation carried out in retaining the reproduction of source disc and a copy operation carried out in PC-like manner, and making possible a copy operation reflecting a copy protection information.

To achieve the above objects, a DVD recording/reproducing apparatus according to a first aspect of the present invention includes a copy range designator for designating a copy range of data to be copied from a source disc to a dubbing disc, a VOBU fetcher for fetching VOBU according to information designated by the copy range designator, a copy protection information fetcher for fetching copy protection information from control packs in the VOBU fetched by the VOBU fetcher, a copy protection information determiner for determining a type of copy protection type, such as copy-fully-permitted, only-once copy-permitted, or copy-prohibited according to the information from the VOBU fetcher, a copy protection information updater for updating the copy protection information when determined copying of data being permitted, and a disc drive for recording data thus processed into the dubbing disc.

A DVD recording/reproducing apparatus according to a second aspect of the present invention, wherein data are recorded in the data area in a form divided into a plurality of objects, the respective objects are in turn comprised of one or more data units, the respective data units are in turn packed into a plurality of packs packing therein video data and audio data to be reproduced within 0.4 sec through 1.0 sec, and management packs packing therein data unit reproduction management information are located on the head of the respective data units, and wherein the management area contains therein reproducing order defining information and object managing information, the reproducing order defining information is comprised of one of more pieces of program chain information, the respective program chains are each comprised of one or more pieces of cell information, the respective pieces of cell information include information designating objects to be reproduced, time information for starting presentation of the objects, time information for ending presentation of the objects, and the object managing information manages the object, includes a reproducing section for reproducing data from a source disc, a copy permission determining section for fetching the managing information from the data reproduced from the sourced disc by the reproducing section, reading data in units of the data units according to the pieces of program chain information and the pieces of object managing information to determine copy protection information in the first one of the management information packs, a recording section for recording the data units into a dubbing disc according to instructions from the copy permission determining section only when copying of the data units is permitted, and an information reconstructing section for reconstructing program chain information and object managing information according to information determined in the copy permission determining section, wherein the program chain information and the object managing information from the information reconstructing section are recorded into the dubbing disc.

In a DVD recording/reproducing apparatus according to a third aspect the invention, I-picture data in the data units are transferred to a decoder to be reproduced in the range from the one at time the determining section had determined copying of data being permitted to the last one of the I-pictures.

A DVD recording/reproducing apparatus according to a forth aspect the invention, includes, further to the first aspect of apparatus, a copy range designator for designating a copy range in units of data units, a VOB boundary detector for determining whether if a designated data unit exists on a boundary between objects, a VOB divider for dividing a VOB based on information from the VOB boundary detector if the designated data unit exists on a position other than the VOB boundary, a cell boundary detector for determining if the VOB boundary exists on a boundary between cells, a cell divider for dividing cells based on information from the cell boundary detector if the designated data unit exists on a position other than the cell boundary, and a VOB number updater for updating information designating objects recorded on respective pieces of cell information in the program chain information at the last of data processing.

A DVD recording/reproducing apparatus according to a fifth aspect the invention, includes, further to the first aspect of apparatus, a copy times information fetcher for fetching copy times information from the copy protection information when the determining section had determined copying of data being permitted, and a copy protection information updater for updating the copy protection information by decrementing the copy times by "1", based on the information obtained in the copy times information fetcher.

The DVD recording/reproducing apparatus according to the present invention is able to carry out a high-speed copying (dubbing) operation while reflecting copy protection information on copied data.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a diagram showing the contents of CTL pack according to the embodiment of the present invention;

DESCRIPTION OF THE PREFERRED EMBODIMENTS

The present invention will be described in detail with reference to the FIGS. 1 through 17.

In DVD-Video discs, data are recorded at a conventional file format. In RTR-DVD, one unit of moving picture video object set VOBS file exists in one disc. Also reproduction order information is recorded in an original program chain PGC for use in reproduction just in the order the same as the recording order.

Figure 2:
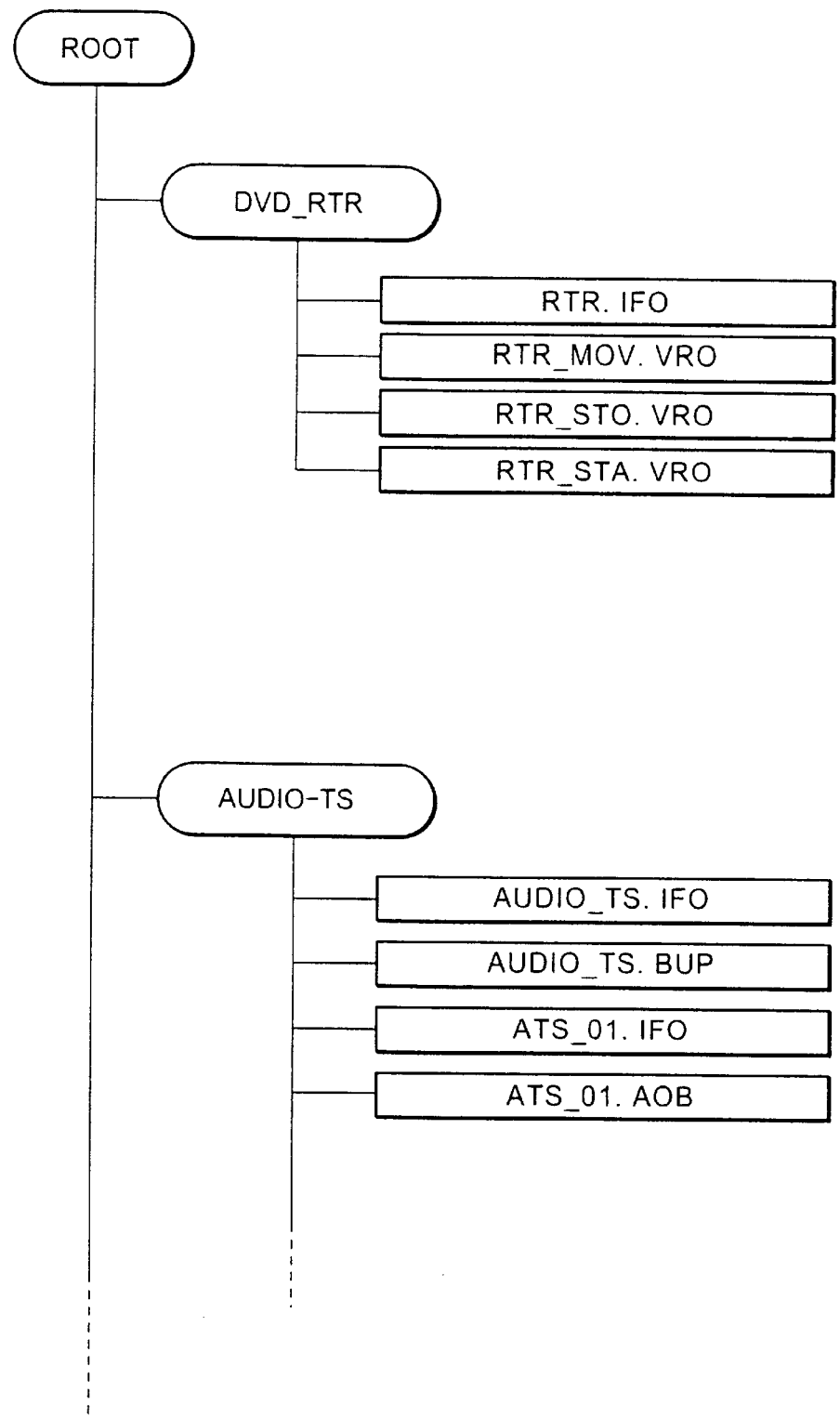
FIG. 2 is a diagram showing an RTR-DVD directory structure for explaining the embodiment of the present invention.

In DVD families, individual standards have their own directories. That is, as shown in FIG. 2, the root directory (ROOT) of DVDs is linked to individual sub-directories, i.e., video title set VIDEO-TS in DVD-Video, audio title set AUDIO-TS in DVD-Audio, and DVD-RTR in rewritable-DVD. Individual recorded data are present in the directories.

In DVD-Video system, a file called video manager VMG is present as information (navigation data) for managing titles. Furthermore, each title set comprises a video title set information (VTSI) file for managing the title set, a video file having video data and a backup file for the VTSI.

The afore-mentioned video files are arranged in a hierarchical structure wherein each file is constructed by a plurality of program chains. Each program chain is constructed by a plurality of programs, and each of which is, in turn, constructed by a plurality of cells, each of which is, in turn, constructed by a plurality of VOBUs. Further, each VOBU is constructed by packs each containing a plurality of different kinds of data. One or more packets and a pack header in turn, construct each pack.

Further, in the RTR-DVD standard, the VMG file is provided as an information file for managing video data.

Figure 3:
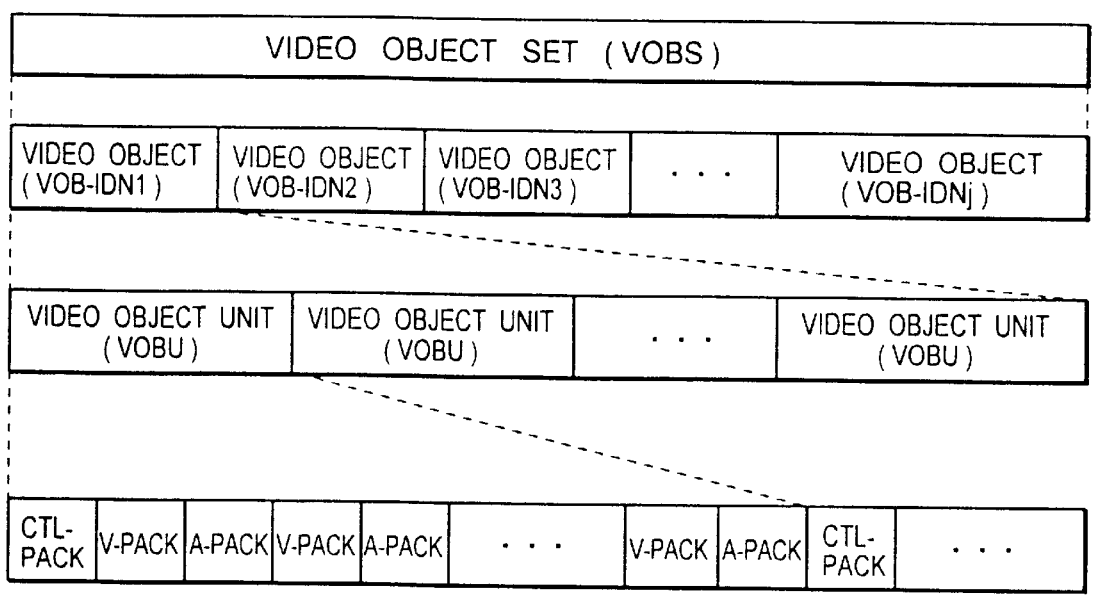
FIG. 3 is a diagram showing a hierarchical structure of VOBS according to the embodiment of the present invention.

The video file is managed in the hierarchical structure, as shown in FIG. 3, and one or more program chains PGCs, each of which is, in turn, constructed by a plurality of VOBU, construct one file. Each VOBU is constructed by packs each containing a plurality of different kinds of data, in similar to the case of the DVD-Video system. Further, since in the current RTR standard any pack for storing copy protection information in contents of recorded video data, the RTR according to the present invention is revised to include the CTL packs as mentioned above.

Each of these packs serves as a minimum unit of data transfer. The order of reproducing is defined by the PGC, and in each of the PGC a plurality of programs PGs are registered, and in turn in each of the PG cells are registered. Further in each of the cell VOB numbers are registered, and therein VOB presentation start time and presentation end time are described.

Figure 4:
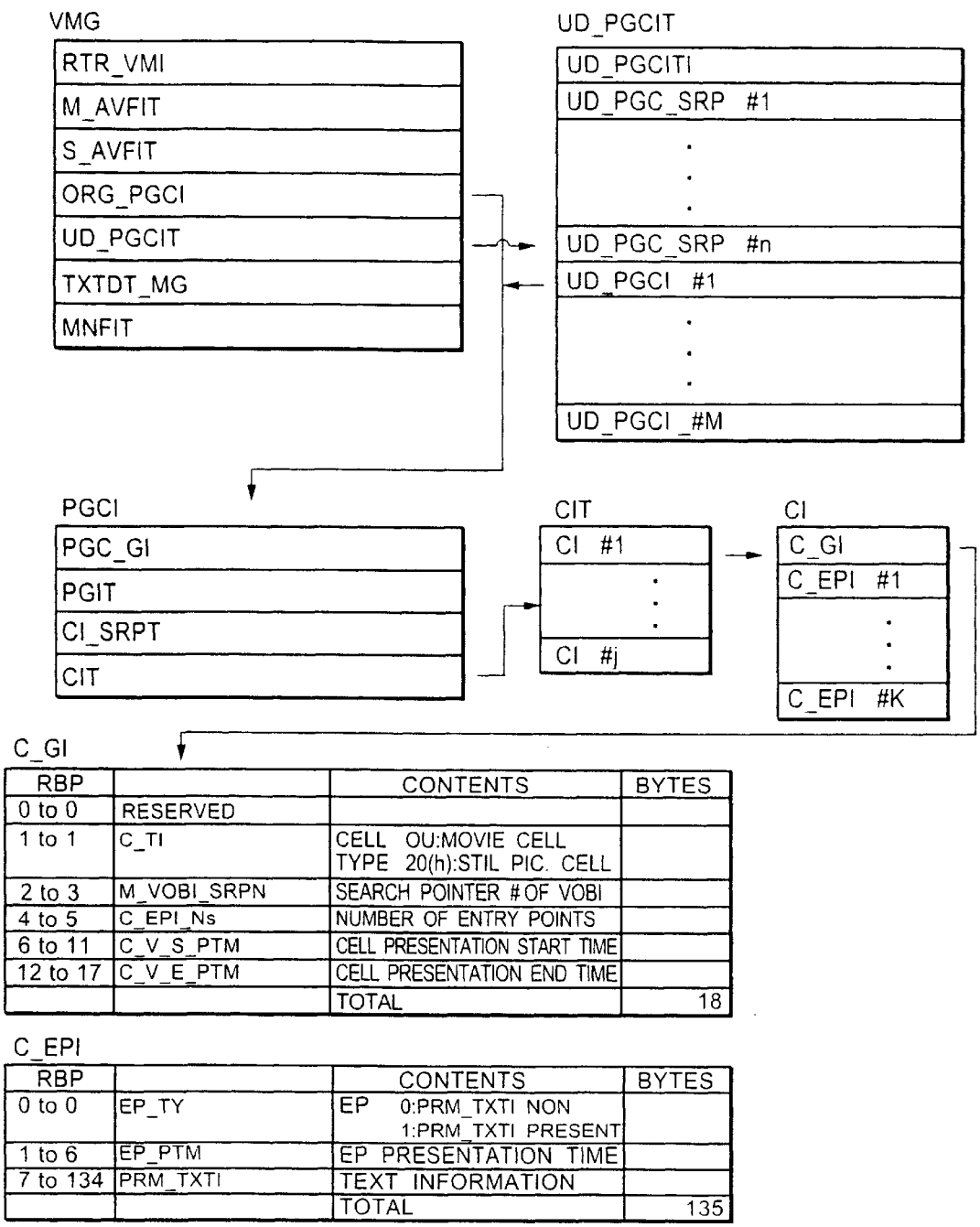
FIG. 4 is a diagram showing the contents of CI according to the embodiment of the present invention.
Figure 5:
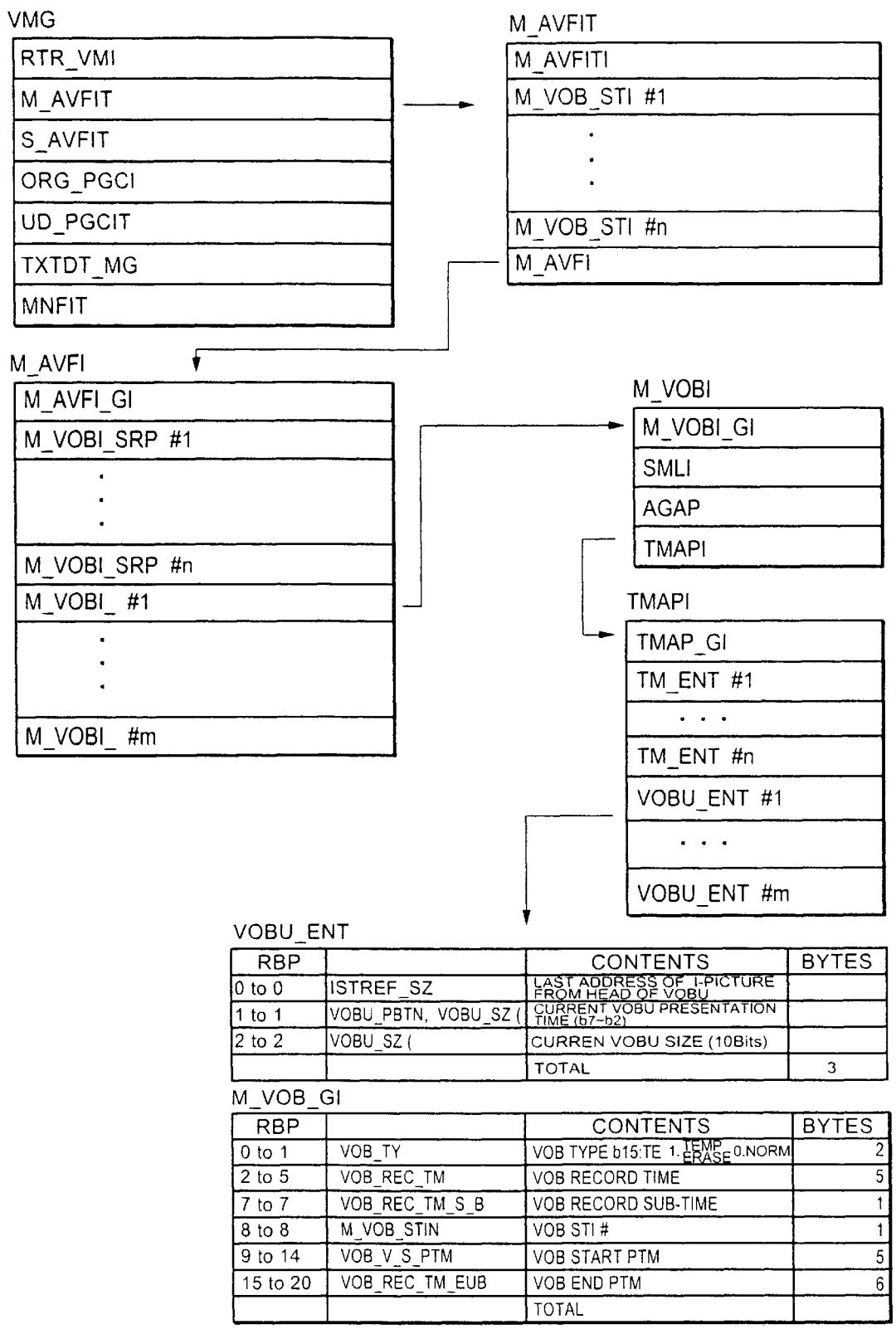
FIG. 5 is a diagram showing the contents of VOBI_ENT and VOB_GI according to the embodiment of the present invention.
Figure 7:
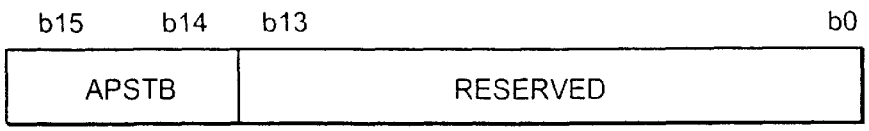
FIG. 7 is a diagram showing the contents of NV pack according to the embodiment of the present invention.

The structure of the PGC is actually recorded in the area of program chain information PGCI, as shown in FIG. 4. The PGCI is produced at the time of reproducing or editing operation, while the reproduction of the PGC is carried out according to the PGCI.

In the RTR-DVD system a PGC for reproducing in the recording order is specifically referred to an original PGC. This original PGC information is recorded in ORG_PGCI. Further, a logical processing is carried out in a minimum unit of the cell.

Figure 1:
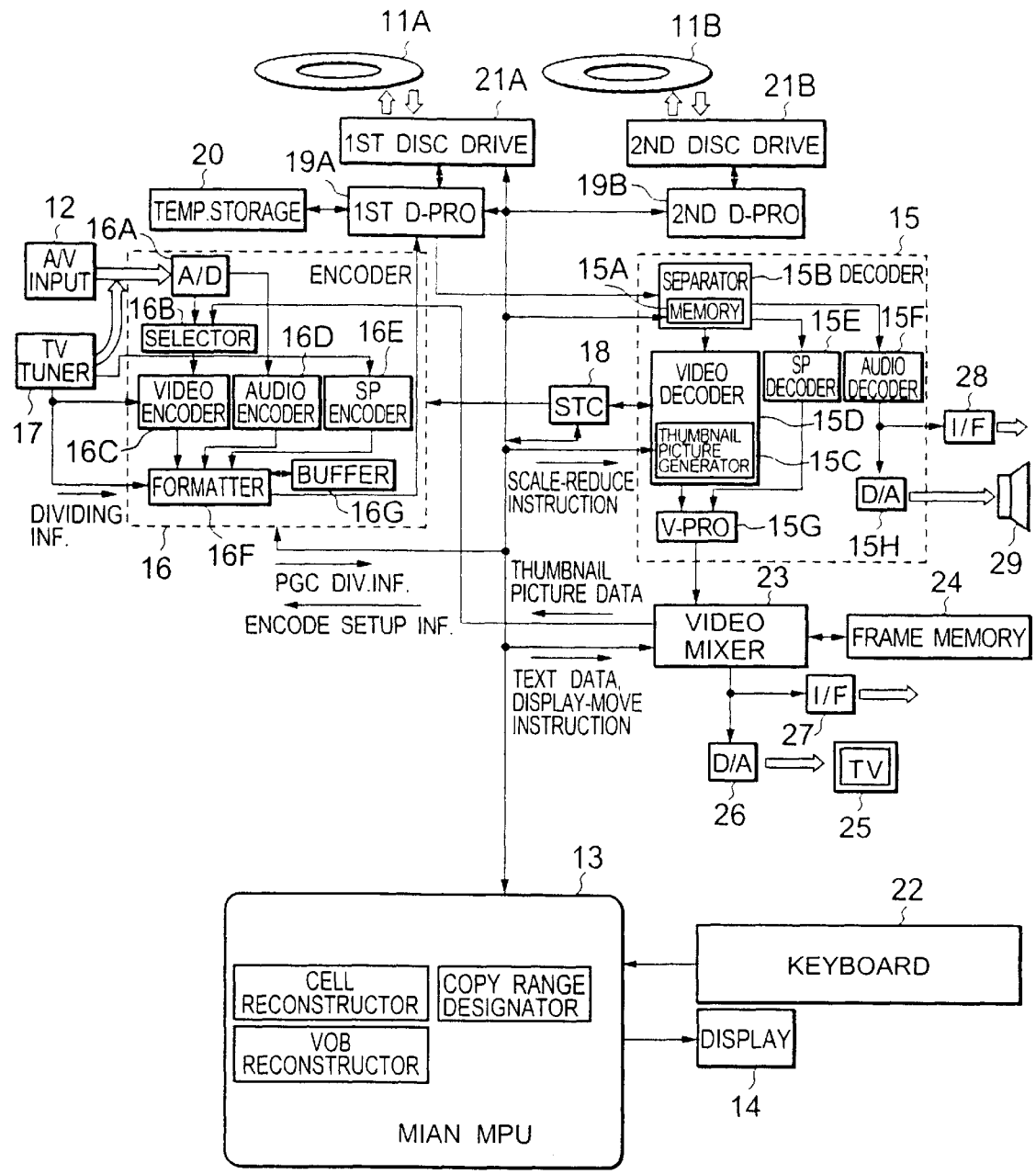
FIG. 1 is a block diagram showing a recording/reproducing apparatus, for illustrating one embodiment of the present invention.

Referring now to FIG. 1, an embodiment of a DVD recording/reproducing apparatus according to the present invention will be described. Here, this embodiment of the DVD recording/reproducing apparatus is the one that reproduces information recorded on a source DVD-RAM disc (hereinafter, referred to a source disc) 11A and then copies the reproduced information to a dubbing DVD-RAM disc (hereinafter, referred to a dubbing disc) 11B. As shown in FIG. 1, the recording/reproducing apparatus is principally comprised of an A/V (Audio/Video) input section 12, an MPU (Microprocessor Unit) 13, a monitor display 14, a decoder 15, an encoder 16, a TV tuner 17, an STC (System Time Clock) 18, first and second D-PROs (Data Processors) 19A and 19B, temporary storage 20, first and second disc drives 21A and 21B, a keyboard 22, a video mixer 23, a frame memory 24, a video D/A (Digital/Analog) converter 26 for interfacing signals to a TV receiver 25 and digital output I/Fs (Interfaces) 27 and 28.

Further, the encoder 16 is principally comprised of an A/D (Analog/Digital) converter 16A, a selector 16B, a video encoder 16C, an audio encoder 16D, an SP (Sub-Picture) encoder 16E, a formatter 16F and a buffer memory 16G. The decoder 15 is also comprised of a separator 15B incorporating therein a memory 15A, a video decoder 15D incorporating therein a thumbnail picture generator 15C, an SP decoder 15E, an audio decoder 15F, a V-PRO 15G and a D/A converter 15H for interfacing signals with to a speaker 29.

A data processing in the embodiment is comprised of two parts, i.e., a process for video recording and a process for reproducing.

Further, data processing during image recording operation is carried out as follows. Upon receiving an image recording instruction from keyboard 22, MPU 13 reads management data from the dubbing disc 11B via the second disc drive 21B, and determines a write area.

MPU 13 then sets up a management area to be able to write data in the determined area, and sets up a write start address of video data in the second disc drive 21B to prepare for recording data to the dubbing disc 11B.

The MPU 13 then resets the STC 18. The STC 18 serves as a timer all over the apparatus, and recording or reproduction is carried out in reference to the clock signal generated from the STC 18. Furthermore, MPU 13 carries out a variety of setup operations.

A flow of a video signal upon actual copy operation to the dubbing disc 11B advances as follows.

AV signals input from the A/V input section 12 or TV tuner 17 are A/D-converted. Then the digital signal is supplied to video encoder 16C, audio encoder 16C or SP encoder 16E.

For example, a digital video data is supplied to the video encoder 16C, and therein it is compressed according to the MPEG standard. A digital audio data is supplied to the audio encoder 16D, and therein it is compressed according to the MPEG-Audio standard. Character data in a teletext signal or the like received through TV tuner 17 is supplied to SP encoder 16E, and wherein it is subjected to a run-length compression.

At that time, MPU 13 fetches a VBI (Video Blanking Information) from the video data, and then records copy protection information produced from a CGMS (Computer Graphics and Movie System) information in a CTL pack having contents of tables as shown in FIG. 6.

In case of DVD-ROM video format signals, they are recorded to a presentation control information (PCI) packet within navigation (NV) pack when an analog protection system information APS which indicates the format of analog copy protection or the ON/OFF state of this copy protection is contained.

Furthermore, the respective encoders 16C, 16D, 16E compress the their input signals, and packetize them into packets each having a size of 2,048 bytes, and supply the packets to formatter 16F. The formatter 16F packs and multiplexes the packets, and then every time the size of the packed data reaches to one unit of CDA the formatter 16F supplies them into the first D-PRO 19a.

Also in this time, every GOP (Group of Picture) unit of the packet data is divided into VOBUs. Information concerning the division is collected in the buffer memory 16G, and then transferred to the MPU 13 in every time the amount of the dividing information reaches to a prescribed value. The MPU 13 prepares time map information based on the dividing information, and outputs the time map information at an interruption to the leading end of GOP.

Here, the dividing information (VOBU information) can be a size of VOBU, a reproduction time from head to end of VOBU or an LBN (Logical Block Number) from the leading end of VOBU to the trailing end of the I-picture, i.e., an intra-frame coding picture. Alternatively, the formatter 16 can directly prepare the time map information based on the dividing information, and then transfers them in form of TMAP (Time Map) to the MPU 13.

In the first D-PRO 19A, it prepares one ECC (Error Correction Code) block in every 16 packs and adds thereto an error correction data, and then record them on the dubbing disc 11B through the first disc drive 21A. When the first disc drive 21A is busy in seeking data or jumping tracks, they are temporarily stored in the temporary storage 20 and wait till the first disc drive 21A becomes ready to accept them. Furthermore, in case of rewritable DVDs it is so defined that each disc contains only one video file.

In the second D-PRO 19B, it prepares one ECC block in every 16 packs and adds thereto an error correction data, and then record them on the dubbing disc 11B through the second disc drive 21B. When the second disc drive 21B is busy in seeking data or jumping tracks, they are temporarily stored in the temporary storage 20 and wait till the second disc drive 21B becomes ready to accept them. Furthermore, in case of rewritable DVDs it is so defined that each disc contains only one video file.

However, a microcomputer is able to read/write data by running a microcomputer bus to the first and second D-PROs 19A, 19B for read/write of the management area of files.

Further, a movie AV file information table information M_AVFITI for managing video data and the PGCI for controlling the reproduction order of cells are recorded. While, a CDA table is recorded in the file system as an AV-dedicated file extent.

Among them, an original PGC information ORG_PGCI is used for preparing the TMAPI in the M_AVITI according to the dividing information, and for setting PGCI in the recording order.

Figure 8:
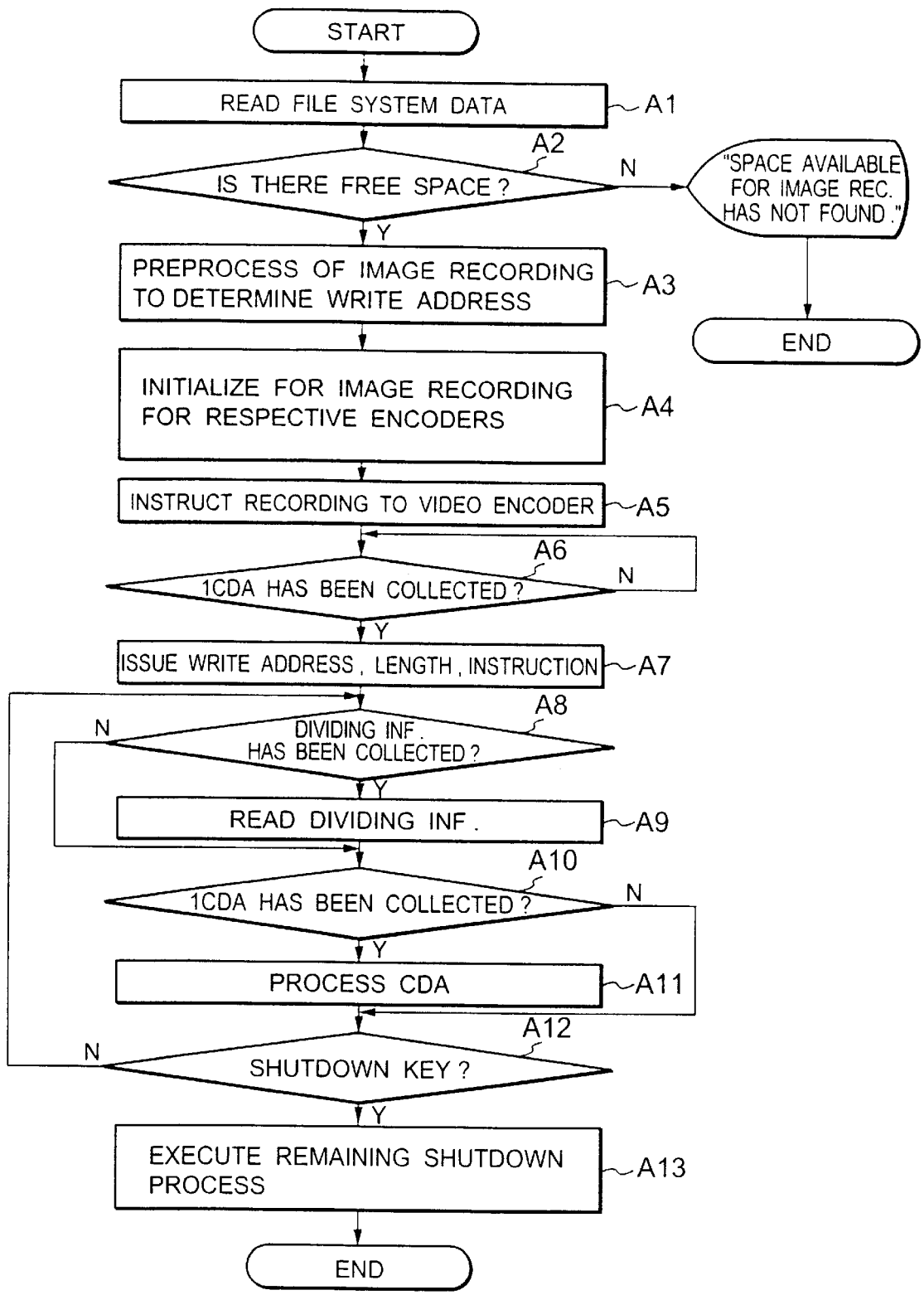
FIG. 8 is a flow chart for explaining a recording operation according to the embodiment of the present invention.
Figure 9:
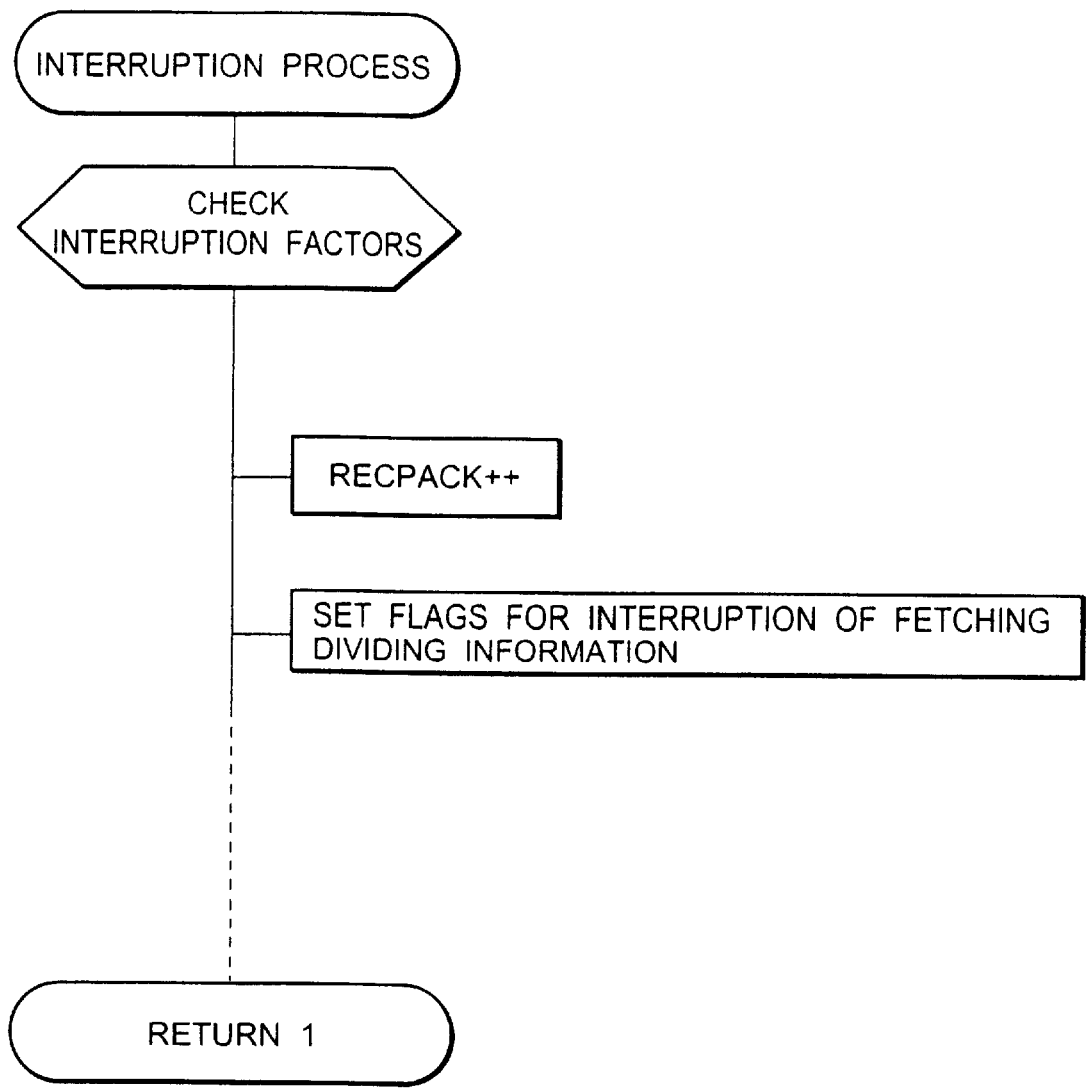
FIG. 9 is a flow chart for explaining an interruption process in the recording operation according to the embodiment of the present invention.

Referring now to the flowchart in FIG. 8, a flow of image recording processing will be described.

Step A1: Reads a file system data.

Step A2: Check whether there is a free space (YES) or not (NO). In case of NO, the process goes to Step A14, and wherein displays a message saying, "Space available for image recording has not found" on the monitor display 14, and then terminates the image recording processing.

In case of YES in the check at Step A2, the process goes to Step A3, and wherein executes preprocesses for the image recording and determines write addresses.

Step A4: Executes the initialization for image recording for the respective encoders 16C, 16D and 16E. At this time, establishes criteria for dividing PG, CELL and VOBU in formatter 16F so as that formatter 16F can automatically execute the dividing operation. Also when an alignment processing will be executed, a criterion for the alignment processing is established in the formatter 16F.

Step A5: Sets a record start instruction for the video encoder 16C. When a first full amount of one CDA has been collected in the buffer memory 16G at Step A6, issues a write address, a write length and a write instruction to the second disc drive 21B at Step A7.

Step A8: Checks whether a dividing information has been collected (YES) or not (NO). In case of YES, the process goes to Step A9, and wherein reads the dividing information from the formatter 16F.

Step A10: Checks whether one CDA of data has been collected in the buffer memory 16G (YES) or not (NO). In case of NO, the process jumps to Step A12. In case of YES at the check in Step 10, the process goes to Step 11, and wherein executes CDA processing during image recording operation, and issues a record address, a record length and a record instruction to the second disc drive 21B.

Step A12: Checks whether a recording operation shutdown key has been operated (YES) or not (NO). In case of NO, the process returns to Step A8.

In case of YES at the check in Step 12, the process goes to Step 13, and wherein updates VMG in the work memory based on the dividing information supplied from the formatter 16F. At this time, clears a temporary erase flag of video object information VOBI in the M_AVFITI.

In Step A13, a variety of other processes to shutdown the video recording operation are also executed.

Furthermore, there are interruption processes, such as an interruption processing for alarming from the formatter 16F that the amount of the dividing information has been reached to a prescribed value, an interruption processing for alarming that one pack of data has been transferred from the first D-PRO 19A, and they are respectively processed. At this time, in case of DVD-ROM Videos when detected that APS is contained in the disc, record as such.

Further, the data processing during a reproduction operation is carried out as follows.

Upon receiving a playback instruction, MPU 13 reads data on the management area via disc drive 21A and the first D-PRO unit 19A, VMG file from file system, and determines PG to be reproduced and CELL from VMG data, VOB to be reproduced from the CELL information and reproduction start address from the VOBI data. MPU 13 then sends the determined address of data to be reproduced and a read instruction for the data to first disc drive 21A.

In response to the instruction sent thereto, disc drive 21A reads out sector data from the source disc 11A, performs error correction using first D-PRO 19A, and outputs the readout data to decoder 15 in the form of pack data.

In decoder 15, separator 15B receives and packetizes the readout pack data. Depending on errands of data, MPU 13 transfers video packet data (MPEG video data) to video decoder 15D, audio packet data to audio decoder 15F, and sub-picture packet data to SP decoder 15E.

At the beginning of transfer of the respective packet data, PTS included in a header is loaded to STC 18. After that, the respective decoders 15D, 15E and 15F carry out the reproduction operations in synchronism with presentation time stamp PTS values in packet data, and thus moving picture data with sounds and subtitles can be reproduced on a TV.

Figure 10:
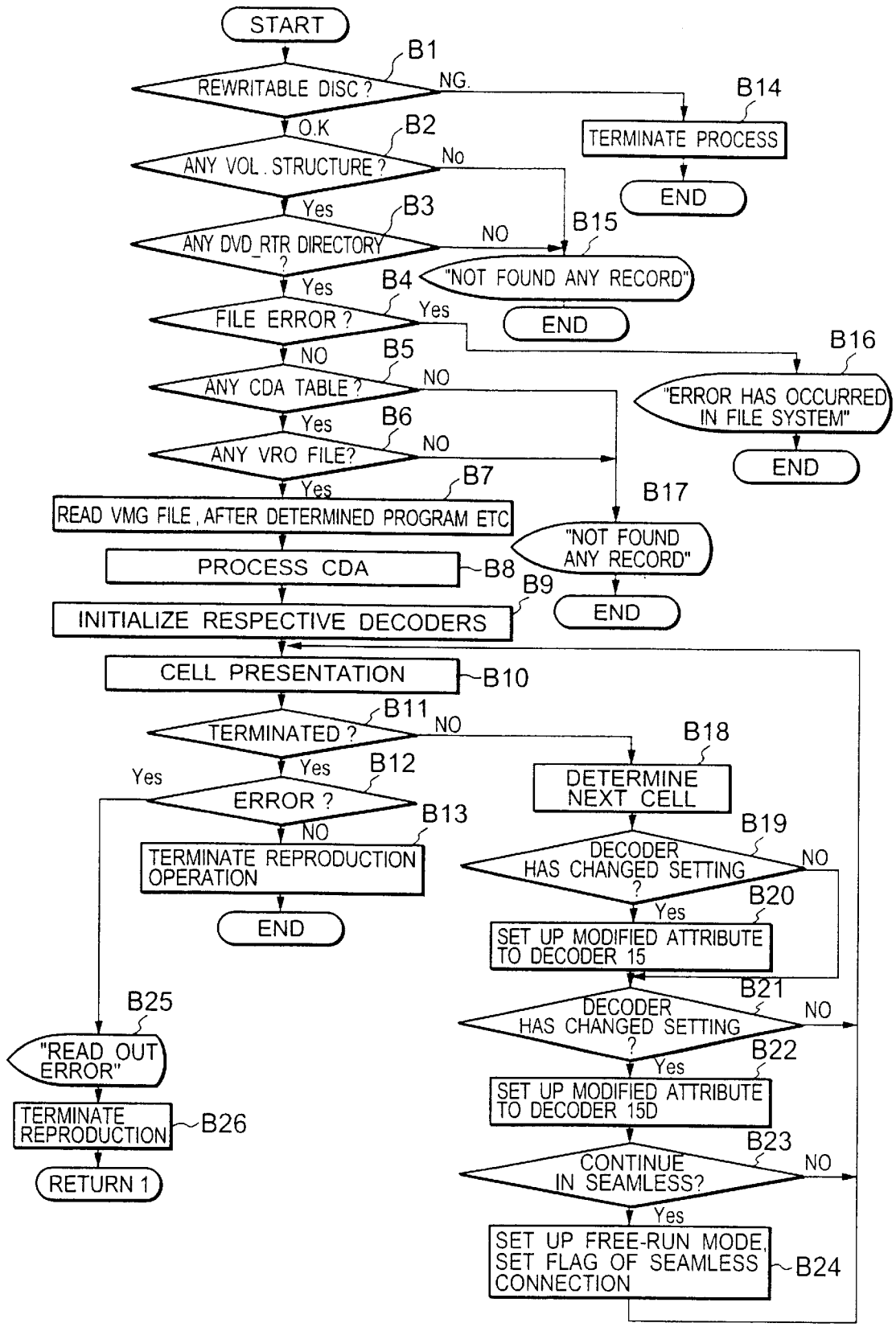
FIG. 10 is a flow chart for explaining a reproduction operation according to the embodiment of the present invention.
Figure 11:
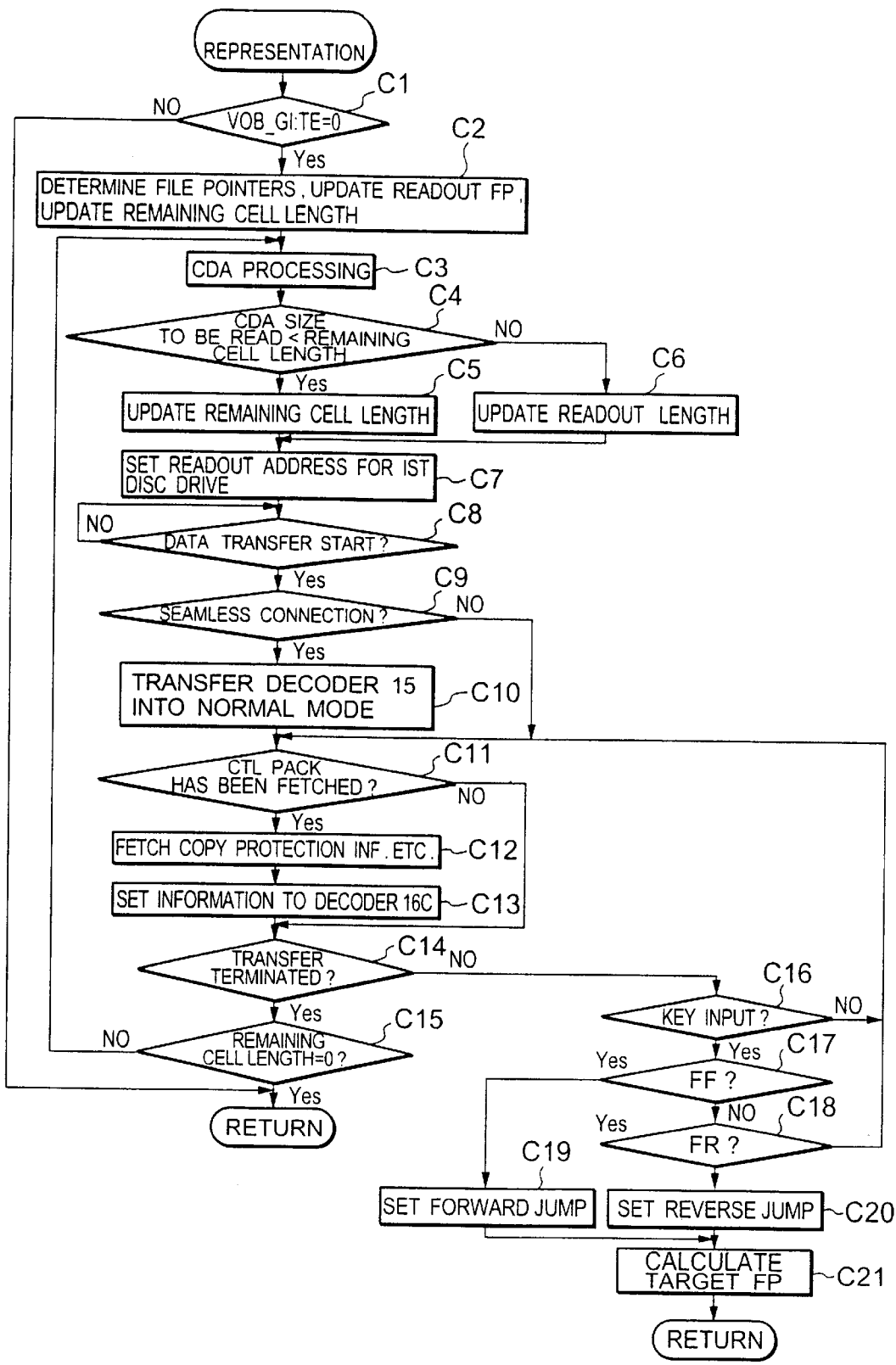
FIG. 11 is a flow chart for explaining a cell presentation process according to the embodiment of the present invention.

Referring now to FIG. 10, the data processing upon reproduction will be described in more detail.

Step B1: Checks the dubbing disc 11B whether the disc is a rewritable disc (YES) or not (NO), i.e., whether the disc is any one of a DVD-R disc, a DVD-RW disc, a DVD+RW disc and a DVD-RAM disc or not. In case of NO, the process goes to Step B14, and wherein the process is terminated.

Step B2: Reads a file system from the source disc 11A to check whether any volume structure is present (YES) or not (NO). In case of NO, the process goes to Step B15, and wherein displays a message saying, "Not found any record of video signal" on the monitor display 14, and then terminates the image recording processing.

Step B3: Checks whether any DVD_RTR directory is present (YES) or not (NO). In case of NO, the process also goes to Step B15, and wherein displays a message saying, "Not found any record of video signal" on the monitor display 14, and then terminates the image recording processing.

Step B4: Checks whether there are any errors in the file systems (YES) or not (NO). In case of YES, the process goes to Step B16, and wherein displays a message saying, "Error has occurred in file system" on the monitor display 14.

Step B5: Checks whether any CDA table is present (YES) or not (NO). In case of NO, the process also goes to Step B17, and wherein displays a message saying, "Not found any record of video signal" on the monitor display 14, and then terminates the image recording processing.

Step B6: Checks whether any VRO file is present (YES) or not (NO). In case of NO, the process also goes to Step B17, and wherein displays a message saying, "Not found any record of video signal" on the monitor display 14, and then terminates the image recording processing.

Step B7: Reads a VMG file, and after a user has determined (chosen) programs and cells to be reproduced based on the read VMG file determines a file pointer (logical address) for starting the reproduction.

Step B8: Executes CDA processes at the start of the reproduction.

Step B9: Executes the initializations for the respective decoders 15D, 15E and 15F.

Step B10: Executes presentation process of cells as described later.

Step B11: Checks whether the cell presentation has terminated (YES) or not (NO). In case of YES, the process goes to Step 12, and wherein checks whether therein an error (YES) or not (NO). In case of YES, the process goes to Step B25, and wherein displays a message saying "Readout error" and then terminates the reproduction in Step B26. In case of NO at the check in Step B12, the process goes to Step 13, and wherein executes a variety of other processes to terminate the reproduction operation.

In case of NO at the check in Step B11, the process goes to Step B18, and wherein determines the next cell from PGCI.

Step B19: Checks whether the settings of the respective decoders 15D, 15E and 15F have been changed (YES) or not (NO). In case of YES, the process goes to Step 20, and wherein further sets up a modified attribute to the decoder 15 so as that the decoder 15 will be again changed their setups at a next sequence end code (i.e., at the end of VOB).

Step B21: Checks whether the setting, such as a resolution, in the video decoder 15D has been changed (YES) or not (NO). In case of YES, the process goes to Step 22, and wherein sets up a modified attribute to the video decoder 15D so as that the video decoder 15D will be changed their setups after the last sequence end code of a cell (VOB).

Step B23: Checks whether the video data continue to each other in seamless fashion (YES) or not (NO). In case of YES, the process goes to Step B24, and wherein sets up the operation mode of the video decoder 15D to a free run mode, i.e., a mode of decoding and displaying according to synchronization signal of the video signal rather than according to the STC, sets a flag indicating the seamless connection, and then returns to Step B10.

Figure 15:
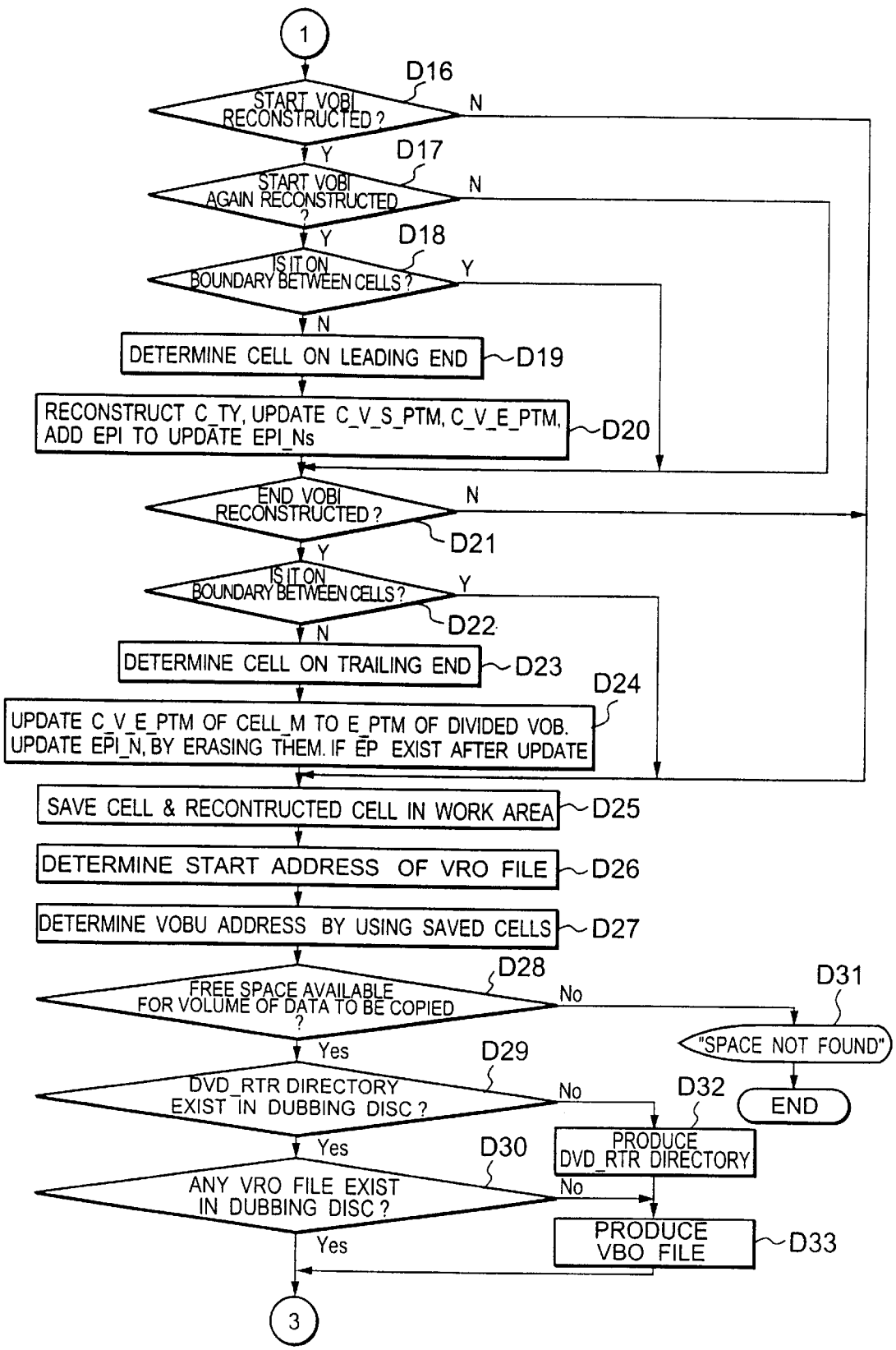

Referring now to FIG. 15, the cell presentation process will be described in more detail.

Step C1: Checks whether a temporary erase TE flag, i.e., an information of VOB_GI (General Information) in the VOB information VOBI is set (YES) or not (NO). In case of YES, terminate this sub-routine and returns to the main-routine. In case of TE=1, it represents the temporary erased VOB.

Step C2: Determines start file pointer FP (logical block address) and end address file pointer FP (logical block address) of cell according to PGCI and TAMPI, and updates readout FP with the cell start FP, while updates remaining cell length with a value subtracted the start FP from the last FP.

Step C3: Executes CDA processing in reproduction, and determines readout address and readout length from start FP.

Step C4: Determines whether a CDA size to be read out is smaller than the remaining cell length (YES) or not (NO), by comparing them with each other. In case of YES, the process goes to Step C5, and wherein updates remaining cell length to a value subtracted the CDA size to be read out from the remaining cell length. In case of NO at the check in Step C4, the process goes to Step C6 and wherein updates the readout length by the remaining cell length and then updates the remaining cell length to the value 0.

Step C5: Updates the readout length with the length of CDA.

Step C7: Sets the first disc drive 21A with readout address, readout length and readout instruction.

Step C8: Checks whether a data transfer has started (YES) or not (NO). In case of NO, repeats Step C8 .

Step C9: Updates the readout FP with the sum of readout FP and the readout length resulted in Step C5, and checks whether the operation is in seamless connection (YES) or not (NO). In case of YES, the process goes to Step C10, and wherein transfers the decoder 15 into a normal mode and then reads out system clock reference SCR.

Step C11: Checks whether CTL pack has been fetched (YES) or not (NO). In case of YES, the process goes to Step 12, and wherein fetches copy protection information from the CTL pack and then sets the information to video encoder 16C in Step C13. Step C14: Checks whether the data transfer has terminated (YES) or not (NO). In case of YES, the process goes to Step S15, and wherein examines whether the remaining cell length is 0 (YES) or not (NO). In case of NO the process returns to Step C3, while in case of YES the process terminates.

In case of NO at the check in Step C14, the process goes to Step S16, and wherein examines key input. If no key input is found, the process returns to Step C11. In case of YES at the check in Step C16, further checks whether a special reproduction, i.e., a fast-forward reproduction (Step C17) or a reverse reproduction (Step C18) has been set (YES) or not (NO). In case of YES at the checks in Steps C17, C18, sets the direction, i.e., forward or reverse, and then calculates a readout FP in using TMAPI, executes CDA processing at the special reproduction, and then terminates the process. That is, in Step C19 sets the jumping direction to the forward direction and also sets readout FP according to its jumping distance. While in Step C20 sets the jumping direction to the reverse direction and also sets readout FP according to its jumping distance. In case of NO at the checks in Steps C17 and C18, the process returns to Step C11.

Step C21: Calculates target FP of the special reproduction from TMAPI by successively skipping a prescribed period of time. Alternatively, it is possible to calculate the target FP by successively skipping a prescribed number of VOBUs rather than the prescribed period of time. When the special reproduction advances to the end of cell, reads out information of following cell according to PGCI, selects TMAPI according to VOB number used in the cell, and then calculates readout FP in similar way to the above-mentioned. Here, it is sure that VOB includes one unit of TMAPI. When cells to be read out had run out, the process terminates.

Now a copy processing will be described.

Figure 12:
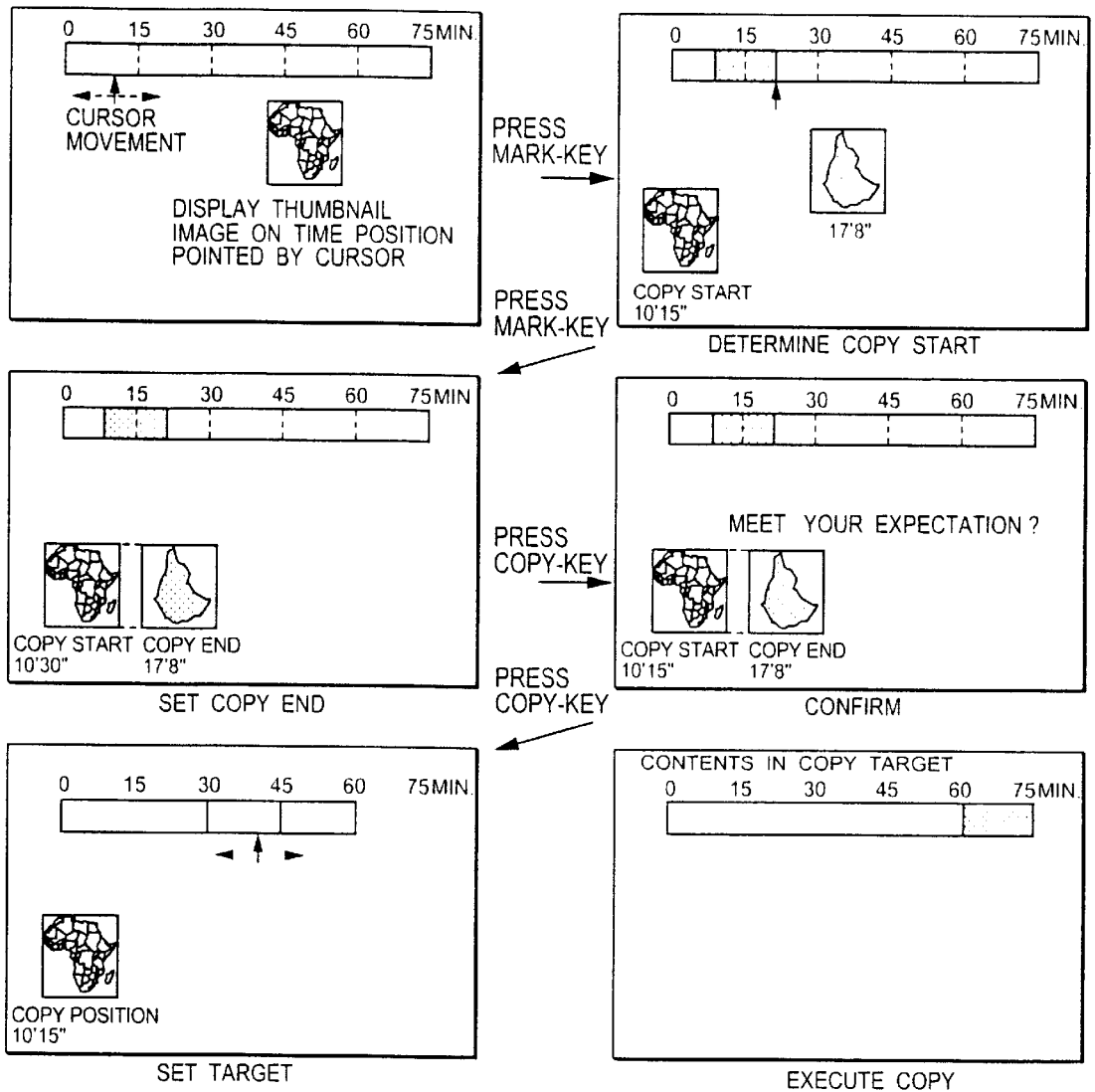
FIG. 12 is a diagram showing progression of screen image in partial copying process according to the embodiment of the present invention.
Figure 13:
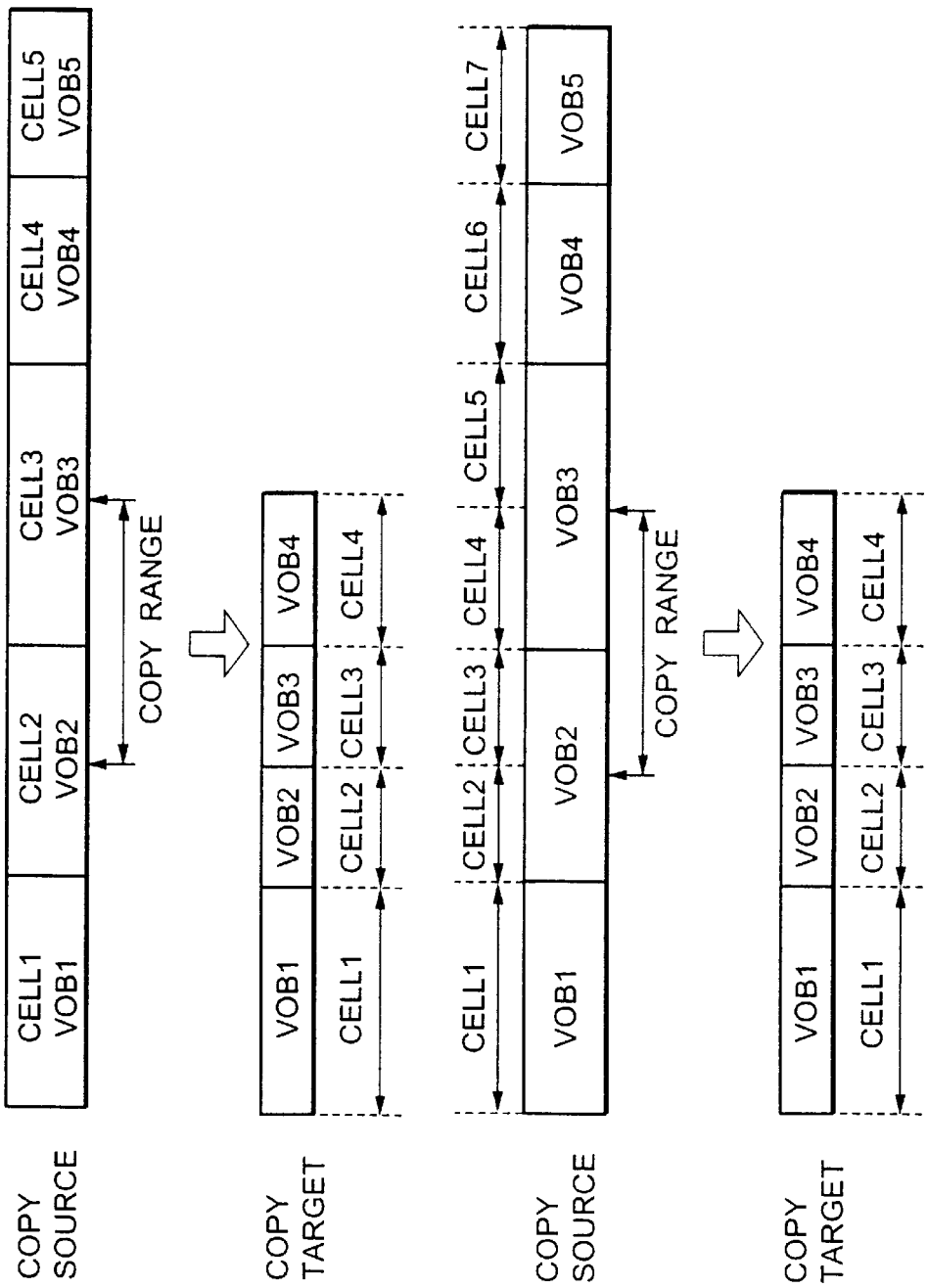
FIG. 13 is a diagram showing exemplified models of VOB/CELL changes in partial copying process according to the embodiment of the present invention.
Figure 14:
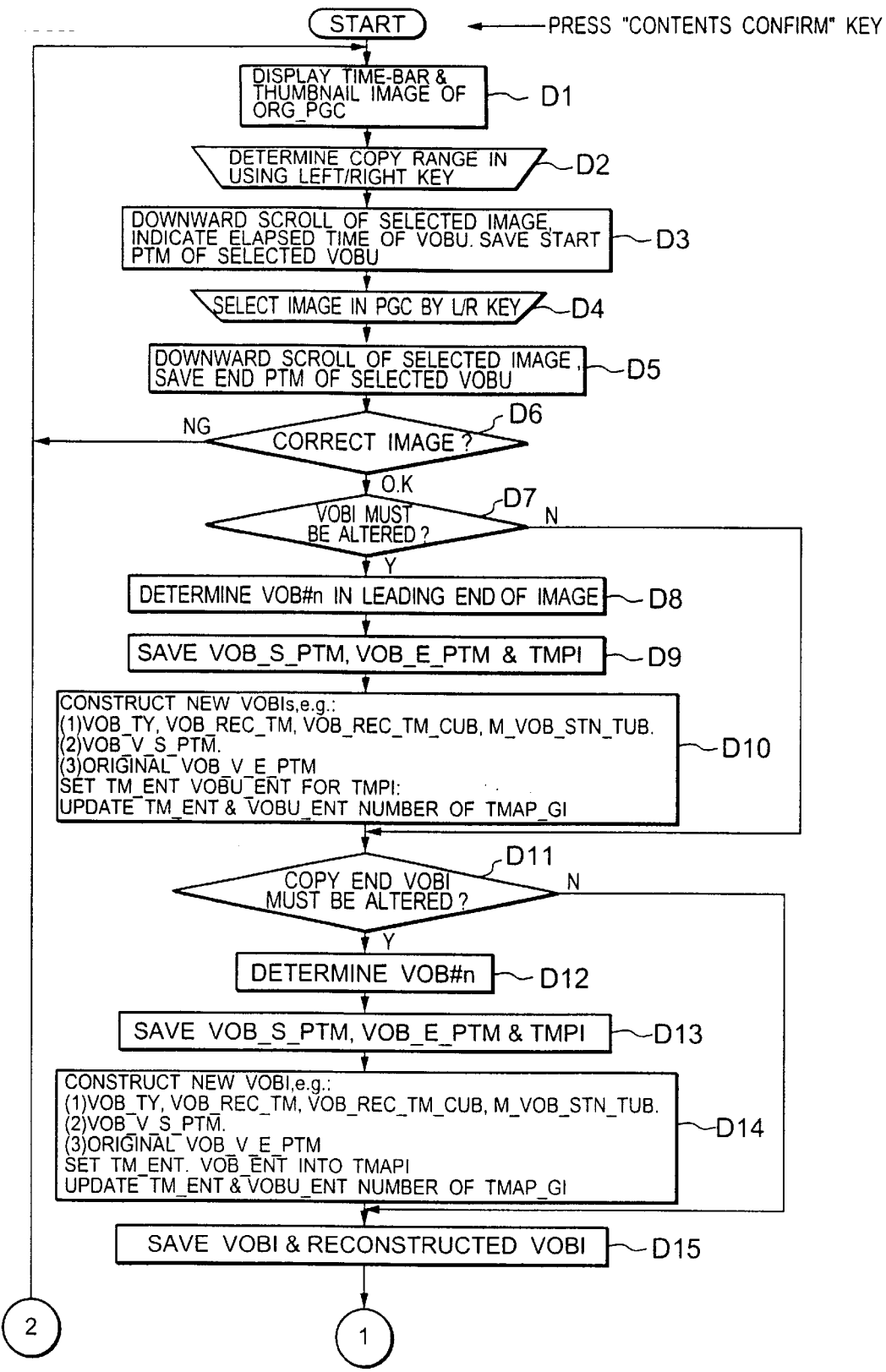
FIGS. 14 to 16 are diagrams showing in combination a flow chart for explaining a partial copying process according to the embodiment of the present invention.
Figure 16:
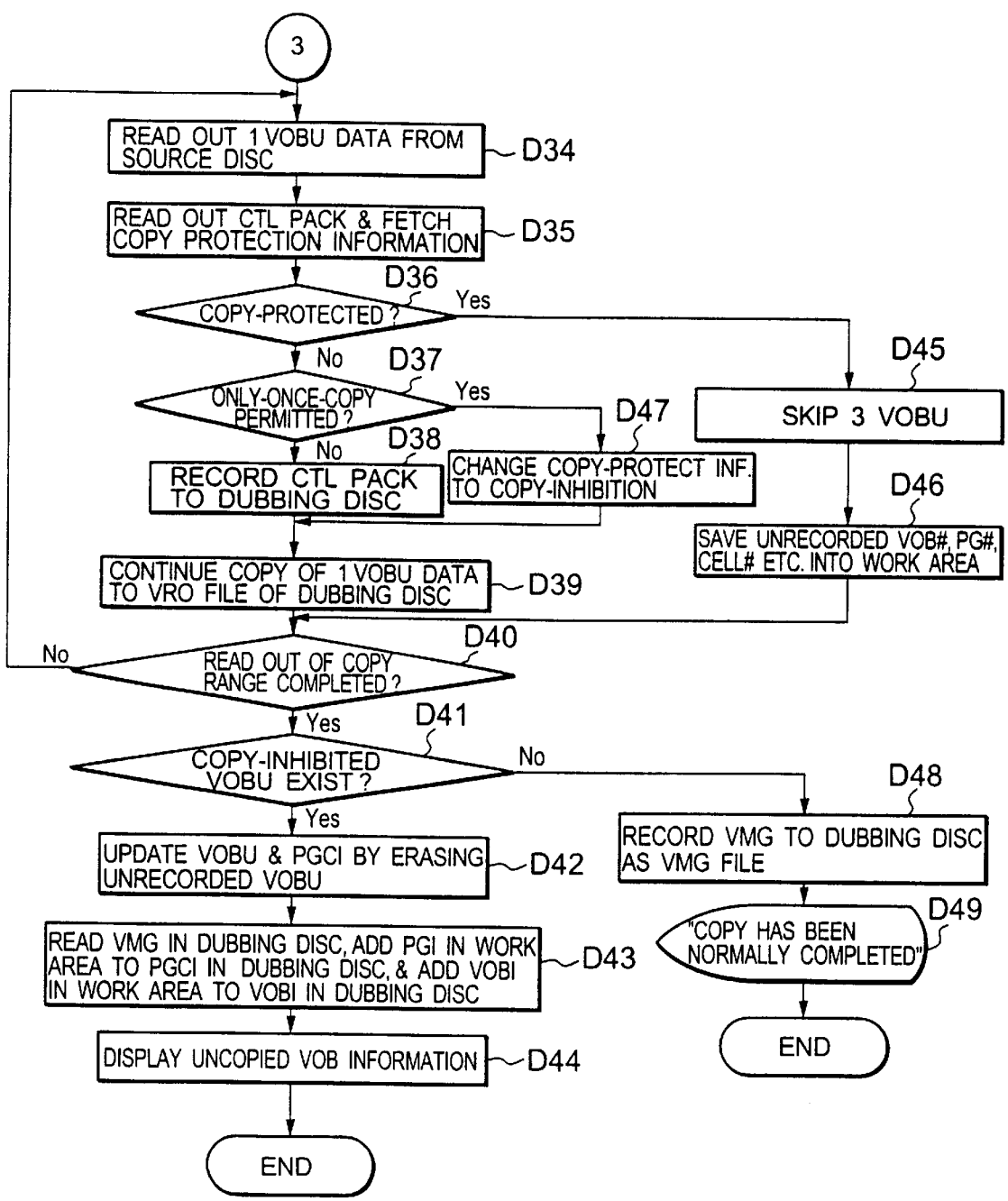

At first, a processing of a partial copy will be described in reference to FIG. 12 representing progression of screen image, FIG. 13 illustrating an exemplified models of VOB/CELL changes in copying operation, and FIGS. 14 to 16 showing flow of the process.

Step D1: Displays ORG_PGC in the forms of a time bar and a reduced-scale image (thumbnail picture).

Step D2: A user determines a copy range by using a left/right key and a mark key on the keyboard 22.

Step D3: executes downward scrolling of selected image, indication of elapsed time of the leading edge of VOBU, and saving of start PTM of selected VOBU.

Step D4: A user selects an image in a PGC by using the left/right key on the keyboard 22.

Step D5: executes downward scrolling of selected image, and saving of end PTM of selected VOBU.

Step D6: Reconfirms whether the selected image is correct (YES) or wrong (NO). In case of YES, the process returns to Step D1.

Step D7: Determines whether the VOBI on the copy start position must be altered (YES) or not (NO). In case of NO, i.e., in case of the copy start position being designated at a boundary between VOBs, there is no need of reconstructing VOBIs. Thus at this time the process jumps to Step D11. While in case of YES, the process goes to Steps D8 to D10 to determine VOB to be reconstructed and to reconstruct a VOBI.

Step D8: Determines the number of VOB (VOB#n) at the leading end of the selected range.

Step D9: Saves start PTM (VOB_S_PTM), end PTM (VOB_E_PTM), and TMPI.

Step D10: Constructs new VOBIs; (1) VOB_TY, VOB_REC_TM, VOB_REC_TM_CUB, M_VOB_STN_TUB, the same as the VOB#n, (2) designated range start PTM (VOB_V_S_PTM) and (3) original VOB_V_E_PTM of divided VOB (VOB_V_E_PTM), sets VOBU containing designated range start PTM to last TM_ENT and VOBU_ENT into TMAPI, and then updates the number of TM_ENT and VOBU_ENT of TMAP_GI to added number.

Step D11: Determines whether the VOBI on the copy end position must be altered (YES) or not (NO). In case of NO, i.e., in case of the copy end position being designated at a boundary between VOBs, there is no need of reconstructing VOBIs. Thus at this time the process jumps to Step D15. While in case of YES, the process goes to Steps D12 to D14 to determine VOB to be reconstructed and to reconstruct a VOBI.

Step D8: Determines the number of VOB (VOB#n) at the trailing end of the selected range.

Step D9: Saves start PTM (VOB_S_PTM), end PTM (VOB_E_PTM), and TMPI.

Step D10: Constructs new VOBIs; (1) VOB_TY, VOB_REC_TM, VOB_REC_TM_CUB, M_VOB_STN_TUB, the same as the VOB#k, (2) start PTM of VOU next to designated range end PTM (VOB_V_S_PTM) and (3) original VOB_V_E_PTM of divided VOB (VOB_V_E_PTM), sets VOBU next to VOBU of designated range end PTM to last TM_ENT and VOBU_ENT into TMAPI, and then updates the number of TM_ENT and VOBU_ENT of TMAP_GI to added number.

Step D15: Saves VOBIs within the designated range and the reconstructed VOBIs in the work area.

Step D16: Determines whether a reconstruction of start VOB has been executed (YES) or not (NO). In case of NO, the process jumps to Step D25, while in case of YES the process goes to next Step D17.

Step D17: Determines whether a start VOB has been reconstructed (YES) or not (NO). In case of NO, the process jumps to Step D21, while in case of YES the process goes to next Step D18.

Step D18: Determines whether the reconstruction position exists on the boundary between CELLs (YES) or not (NO). In case of NO, the process also jumps to Step D21, while in case of YES the process goes to next Step D19.

Step D19: Determines a cell on the leading end of designated range (CELL_N).

Step D20: Reconstructs next CI, i.e., C_TY which is the same as the CELL_N, updates to C_V_S_PTM and C_V_E_PTM which are S_PTM and E_PTM occurred by division, and updates to the number of EPI added to the EPI_Ns by adding EPI within the designated range.

Step D16: Determines whether a reconstruction of end VOB has been executed (YES) or not (NO). In case of NO, the process jumps to Step D25, while in case of YES the process goes to next Step D22.

Step D22: Determines whether the reconstruction position exists on the boundary between CELLs (YES) or not (NO). In case of NO, the process also jumps to Step D25, while in case of YES the process goes to next Step D23.

Step D23: Determines a cell on the trailing end of designated range (CELL_M).

Step D24: Updates C_V_E_PTM of CELL_M to E_PTM of divided VOB, and updates EPI_Ns by erasing them according to the CELLI of the CELL if EP exists after the updated E_PTM.

Step D25: Saves CELLI in the designated range and the reconstructed CELLI in the work area.

Step D26: Determines the start address of VRO file, according to the file system.

Step D27: Determines addresses of VOBUs to be recorded according to saved CELLI and VOBI information.

Step D28: Checks the dubbing disc 11B to determine whether there is a free space equivalent to volume of data to be copied (YES) or not (NO). In case of NO, the process goes to Step D31, and wherein displays a message saying, "Space available for image recording has not found" on the monitor display 14, and then terminates the image recording processing.

Step D29: Checks whether any DVD_RTR directory exists in the dubbing disc 11B (YES) or not (NO). In case of NO, the process goes to Steps D32 and D33, and wherein produces a DVD_RTR directory (Step D32) and a VRO file (Step D33).

In case of YES at the check in Step D29, the process goes to Step D30, and wherein checks whether any VRO file exists in the dubbing disc 11B (YES) or not (NO). In case of NO, the process goes to Steps D33, and wherein produces a VRO file.

Step D34: Reads out one VOBU of data from the source disc 11A according to the VIBI.

Step D35: Reads out CTL packs from the read data, and fetches copy protection information.

Step D36: Determines whether the target data are copy-protected (YES) or not (NO), according to the CTL pack. In case of YES, the process goes to Step D45. In case of NO, the process goes to Step D37, and wherein further determines whether an only-once copy is permitted (YES) or not (NO). In case of YES, the process goes to Step D47 and changes the copy protection information in the CTL pack to copy-inhibition. In case of NO, the process goes to Step D38 and wherein records CTL packs to the dubbing disc 11B. The process then goes to Step D39, and wherein continuously copies one VOBU of data to the VRO file of the dubbing disc 11B. At this time, when it is designated to display I-pictures, one I-picture of data is simultaneously transferred to decoder 15. The I-pictures are reproduced as a fast-forward reproduction image on the screen, and thus it is able to note user that the operation is in active. In case of DVD-ROM Video disc, checks NV packs in the same manner as described above.

Step D40: Determines whether the read out of the copy range has been completed (YES) or not (NO). In case of NO, the process returns to Step D34.

Step D41: Checks whether there is copy-inhibited VOBUs (YES) or not (NO). In case of YES, the process goes to Step D42, and wherein updates the VOBU and PGCI by erasing information of VOB number, VOBU number, PG number and CELL number, which have not been recorded, from the VOBI stored in the work area. When VOBs had had run out from that result, updates the PGIs by erases the CELL in the PGI in the work area wherein those VOBs had been registered.

Step D43: Reads out VMG from the dubbing disc 11B, add the PGI information in the work area to the PGCI in the dubbing disc 11B, and then adds the VOBI in the work area to the VOBI in the dubbing disc 11B.

Step D44: Displays information concerning VOBs being not copied, e.g., record time, program title, etc and then terminates the copy processing.

In case of YES at the check in Step D36, the process goes to Step D45, and wherein skips one VOBU of data.

Step D46: Saves furthermore VOB number, VOBU number, PG number, CELL number etc., which have not been recorded, and then goes to Step D40.

In case of NO at the check in Step D42, the process goes to Step D48, and wherein records VMG data to the dubbing disc 11B as a VMG file.

Step D49: Displays that the copy process has been normally completed.

Figure 17:
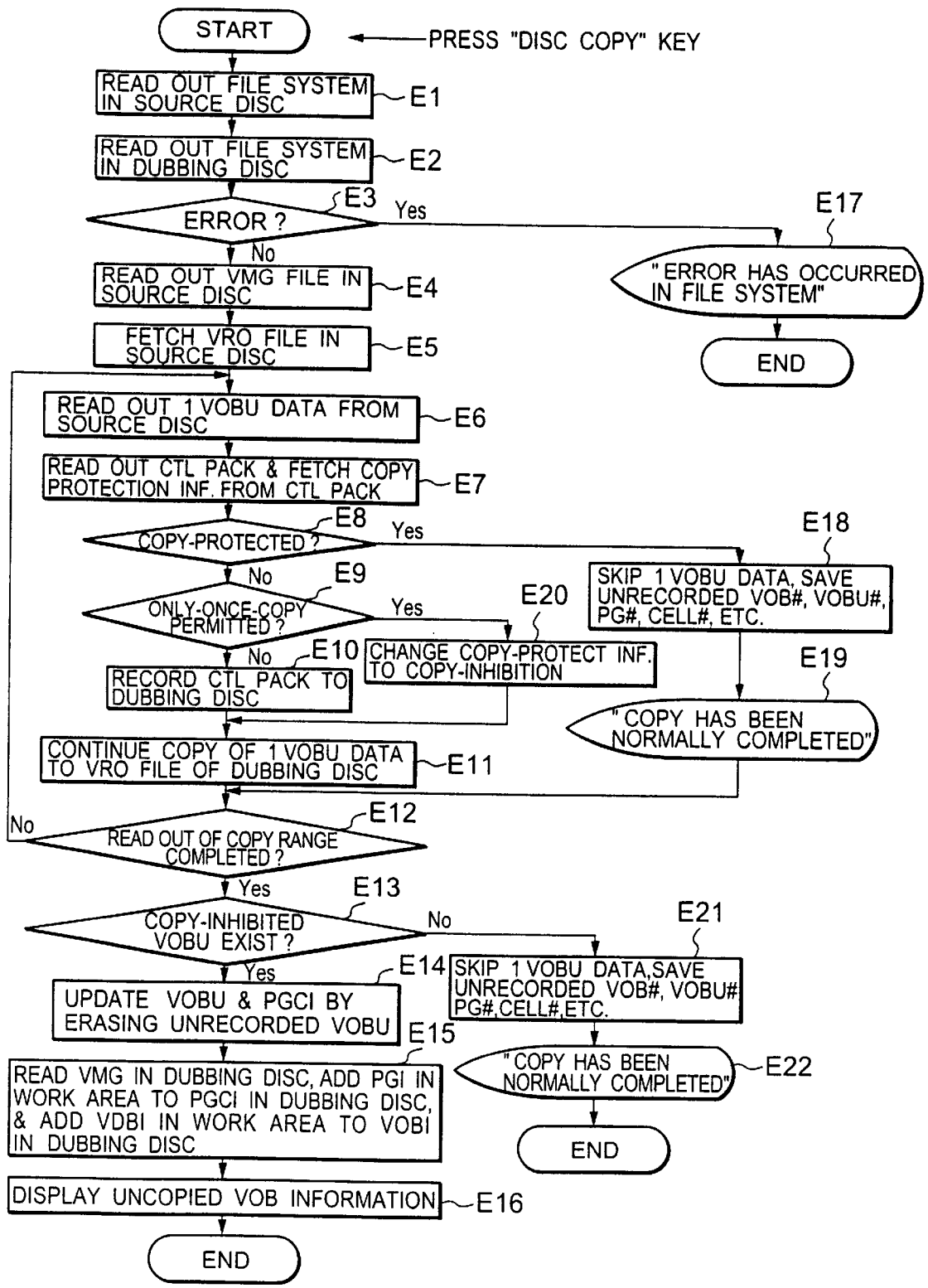
FIG. 17 is a diagram show a flow chart for explaining a disc copying process according to the embodiment of the present invention, in combination.

Referring now to FIG. 17, a process for copying an entire data of the source disc.

Step E1: Reads out the file system in the source disc 11A.

Step E2: Reads out the file system in the dubbing disc 11B.

Step E3: Checks whether there are any errors in the file systems (YES) or not (NO). In case of YES, the process goes to Step E17, and wherein displays a message saying, "Error has occurred in file systems" on the monitor display 14.

In case of NO in check at Step E3, the process goes to Step E4, and wherein reads out VMG file from the source disc 11A in accordance with the file system of the source disc 11a.

Step E5: Fetches VRO file in accordance with the VMG (PGCI, VOBI) and the file system.

Step E6: Reads out one VOBU of data from the source disc 11A in accordance with the VOBI, and then determines the start address of the VOBU in accordance with the ORG_GCI in the VMG file and the VOBI.

Step E7: Reads out a CTL pack, and fetches copy protection information from the CTL pack.

Step E8: Determines whether the target data are copy-protected (YES) or not (NO), according to the CTL pack. In case of YES, the process goes to Step E18. In case of NO, the process goes to Step E9, and wherein further determines whether an only-once copy is permitted (YES) or not (NO). In case of YES, the process goes to Step E20 and changes the copy protection information in the CTL pack to copy-inhibition. In case of NO, the process goes to Step E10, and wherein records CTL packs to the dubbing disc 11B. The process then goes to Step E11, and wherein continuously copies one VOBU of data to the VRO file of the dubbing disc 11B. At this time, when it is designated to display I-pictures, one I-picture of data is simultaneously transferred to decoder 15. The I-pictures are reproduced as a fast-forward reproduction image on the screen, and thus it is able to note user that the operation is in active. In case of DVD-ROM Video disc, checks NV packs in the same manner as described above.

Step E12: Determines whether the read out of the copy range has been completed (YES) or not (NO). In case of NO, the process returns to Step E6.

Step E13: Checks whether there is copy-inhibited VOBUs (YES) or not (NO). In case of YES, the process goes to Step E14, and wherein updates the VOBUs by erasing information of VOBUs being not recorded from the VOBI stored in the work area. When VOBs had had run out from that result, updates the PGIs by erases the CELL in the PGI in the work area wherein those VOBs had been registered.

Step E15: Reads out VMG from the dubbing disc 11B, add the PGI information in the work area to the PGCI in the dubbing disc 11B, and then adds the VOBI in the work area to the VOBI in the dubbing disc 11B.

Step E16: Displays information concerning VOBs being not copied, e.g., record time, program title, etc and then terminates the copy processing.

Step E18: Skips one VOBU of data, saves furthermore VOB number, VOBU number, PG number, CELL number etc. which are not recorded, and then goes to Step E19.

Step E19: Displays that the copy process has been normally completed.

Step E21: Skips one VOBU of data, saves furthermore VOB number, VOBU number, PG number, CELL number etc. which are not recorded, and then goes to Step E22.

Step E22: Displays that the copy process has been normally completed.

As described above, the present invention can provide an extremely preferable DVD recording/reproducing apparatus having a high-speed copying capability.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A DVD recording/reproducing apparatus having a high-speed copying capability for recording/reproducing a medium comprised of a management area and a data area;

wherein data are recorded in the data area in a form divided into a plurality of objects, the respective objects are in turn comprised of one or more data units, the respective data units are in turn packed into a plurality of packs packing therein video data and audio data to be reproduced within 0.4 sec through 1.0 sec, and management packs packing therein data unit reproduction management information are located on the head of the respective data units;

and wherein the management area contains therein reproducing order defining information and object managing information, the reproducing order defining information is comprised of one or more pieces of program chain information, the respective program chains are each comprised of one or more pieces of cell information, the respective pieces of cell information include information designating objects to be reproduced, time information for starting presentation of the objects, time information for ending presentation of the objects, and the object managing information manages the object;

said apparatus comprising:

a reproducing section for reproducing data from a source disc;

a copy permission determining section for fetching the managing information from the data reproduced from the source disc by the reproducing section, reading data in units of the data units according to the pieces of program chain information and the pieces of object managing information to determine copy protection information in the first one of the management information packs;

a recording section for recording the data units into a dubbing disc according to instructions from the copy permission determining section only when copying of the data units is permitted; and an information reconstructing section for reconstructing program chain information and object managing information according to information determined in the copy permission determining section;

wherein the program chain information and the object managing information from the information reconstructing section are recorded into the dubbing disc.

2. An apparatus as claimed in claim 1, wherein I-picture data in the data units are transferred to a decoder to be reproduced in the range from the one at time the determining section had determined copying of data being permitted to the last one of the I-pictures.

3. An apparatus as claimed in claim 1, further comprising:

a copy range designator for designating a copy range in units of data units;

a VOB boundary detector for determining whether if a designated data unit exists on a boundary between objects;

a VOB divider for dividing a VOB based on information from the VOB boundary detector if the designated data unit exists on a position other than the VOB boundary;

a cell boundary detector for determining if the VOB boundary exists on a boundary between cells;

a cell divider for dividing cells based on information from the cell boundary detector if the designated data unit exists on a position other than the cell boundary; and a VOB number updater for updating information designating objects recorded on respective pieces of cell information in the program chain information at the last of data processing.

4. An apparatus as claimed in claim 1, further comprising:

a copy times information fetcher for fetching copy times information from the copy protection information when the determining section had determined copying of data being permitted;

a copy protection information updater for updating the copy protection information by decrementing the copy times by "1", based on the information obtained in the copy times information fetcher.

* * * * *